United States Patent
Iinuma et al.

(10) Patent No.: US 8,830,607 B2
(45) Date of Patent: Sep. 9, 2014

(54) IMAGE PICKUP APPARATUS CAPABLE OF INTERCHANGING LENSES AND LENS MOUNT THEREFOR

(71) Applicant: Canon Kabushiki Kaisha, Tokyo (JP)

(72) Inventors: Futoshi Iinuma, Yokohama (JP);
Kazuhiko Erikawa, Yokohama (JP);
Atsushi Matsushima, Kawasaki (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/858,146

(22) Filed: Apr. 8, 2013

(65) Prior Publication Data

US 2013/0265664 A1 Oct. 10, 2013

(30) Foreign Application Priority Data

Apr. 10, 2012 (JP) ................................. 2012-089306
Apr. 10, 2012 (JP) ................................. 2012-089308

(51) Int. Cl.
*G02B 7/02* (2006.01)

(52) U.S. Cl.
USPC .......................................... 359/828; 359/819

(58) Field of Classification Search
USPC .................................. 359/694–704, 811–830
See application file for complete search history.

(56) References Cited

U.S. PATENT DOCUMENTS 4,322,154 A * 3/1982 Hashimoto et al. ............ 396/505
7,616,392 B2 * 11/2009 Igarashi et al. ................ 359/818

FOREIGN PATENT DOCUMENTS

JP 2004-102005 A 4/2004
JP 3733240 A 1/2006

* cited by examiner

*Primary Examiner* — Mohammed Hasan
(74) *Attorney, Agent, or Firm* — Rossi, Kimms & McDowell LLP

(57) ABSTRACT

An image pickup apparatus having a lens mount capable of easily mounting and dismounting an interchangeable lens to and from an image pickup apparatus body and capable of preventing the interchangeable lens mounted to the image pickup apparatus body from being rattled. In the lens mount, by rotating a movable mount portion about an optical axis from a state where bayonet pawls of the interchangeable lens and pawls of the movable mount portion do not overlap with one another as viewed in an optical axis direction, the movable mount portion moves toward a first fixed portion in the optical axis direction with the progress of engagement between a female screw portion of a stationary mount portion and a male screw portion of the movable mount portion, whereby the pawls and the bayonet pawls are brought in abutment with one another.

10 Claims, 18 Drawing Sheets

IMAGE PICKUP APPARATUS CAPABLE OF INTERCHANGING LENSES AND LENS MOUNT THEREFOR

BACKGROUND OF THE INVENTION

1. Field of the Invention

The present invention relates to an image pickup apparatus capable of interchanging lenses, and relates to a lens mount for the image pickup apparatus.

2. Description of the Related Art

There has been known an image pickup apparatus having an image pickup apparatus body to which an interchangeable lens such as a fixed focal lens, zoom lens, wide-angle lens, telephoto lens, or macro lens can be detachably mounted to make it possible to perform photographing while changing the angle of view, depth of focus, F value, etc. For such type of image pickup apparatus, a bayonet type lens mount has widely been used.

Generally, in the bayonet type lens mount, the interchangeable lens and the image pickup apparatus body are rotated relative to each other in a state that a mount face of the interchangeable lens abuts against amount face of the image pickup apparatus body, thereby engaging pawled portions of these mount faces with one another. At this time, the interchangeable lens is urged toward the image pickup apparatus body by spring members, which are built in the image pickup apparatus body, and is held by the image pickup apparatus body (see, for example, Japanese Laid-open Patent Publication No. 2004-102005).

However, since the interchangeable lens is held by urging forces of the spring members, a problem is posed that the interchangeable lens is rattled by an amount of flexure of the spring members. In particular, a large-sized interchangeable lens is liable to be rattled at the lens mount, resulting in a fear that the quality of photographed image is lowered.

There is also known an image pickup apparatus in which an electrical signal is exchanged between an image pickup apparatus body and an interchangeable lens to control the drive of the interchangeable lens. For power supply and for signal communication, contact terminal portions are provided in the image pickup apparatus body and in the interchangeable lens.

For example, in interchangeable lenses having a lens mount detachably mountable to a mount of an image pickup apparatus body by being rotated about an optical axis relative to the mount of the image pickup apparatus body, there is known an interchangeable lens having a connector configured to be connected with a connector of the image pickup apparatus body (see, Japanese Patent Publication No. 3733240). This interchangeable lens includes a contact support plate fixed with contact pins, a conductor support plate having a conduction part, and an elastic member for causing the conduction part to be in press-contact with the contact pins. The contact support plate, the conductor support plate, and the elastic member each have an end face formed into a comb-teeth shape.

In the case of a mount structure where the interchangeable lens is mounted to and dismounted from the image pickup apparatus body by being linearly moved relative to the image pickup apparatus body without being rotated, however, contact terminal portions of the image pickup apparatus body and contact terminal portions of the interchangeable lens do not rub against one another when the interchangeable lens is mounted to or dismounted from the image pickup apparatus body. Accordingly, a so-called self-cleaning operation is not performed, resulting in a fear that a contact failure can occur.

SUMMARY OF THE INVENTION

The present invention provides a lens mount capable of easily mounting and dismounting an interchangeable lens to and from an image pickup apparatus body and capable of preventing the interchangeable lens mounted to the image pickup apparatus body from being rattled, and provides an image pickup apparatus having the lens mount.

According to one aspect of this invention, there is provided a lens mount provided in an image pickup apparatus body and configured to detachably mount an interchangeable lens having bayonet pawls to the image pickup apparatus body, comprising a fixed portion configured to be fixed to the image pickup apparatus body, a stationary mount portion configured to be fixed to the fixed portion, the stationary mount portion having a body-side mount face configured for abutment with a lens-side mount face of the interchangeable lens and having a first screw portion, a movable mount portion having pawls configured for engagement with the bayonet pawls of the interchangeable lens and having a second screw portion configured for threaded engagement with the first screw portion, and arm portions provided in an area between the fixed portion and the stationary mount portion to project toward the movable mount portion, wherein the movable mount portion rotates with movement of the arm portions, the movable mount portion moves toward the fixed portion with progress of engagement between the first and second screw portions caused by the rotation of the movable mount portion, and the pawls of the movable mount portion are brought in abutment with the bayonet pawls of the interchangeable lens with the movement of the movable mount portion.

With this invention, it is possible to easily mount the interchangeable lens to the image pickup apparatus body and prevent the interchangeable lens mounted to the apparatus body from being rattled.

Further features of the present invention will become apparent from the following description of exemplary embodiments with reference to the attached drawings.

DESCRIPTION OF THE EMBODIMENTS

The present invention will now be described in detail below with reference to the drawings showing preferred embodiments thereof.

First Embodiment

Figure 1:
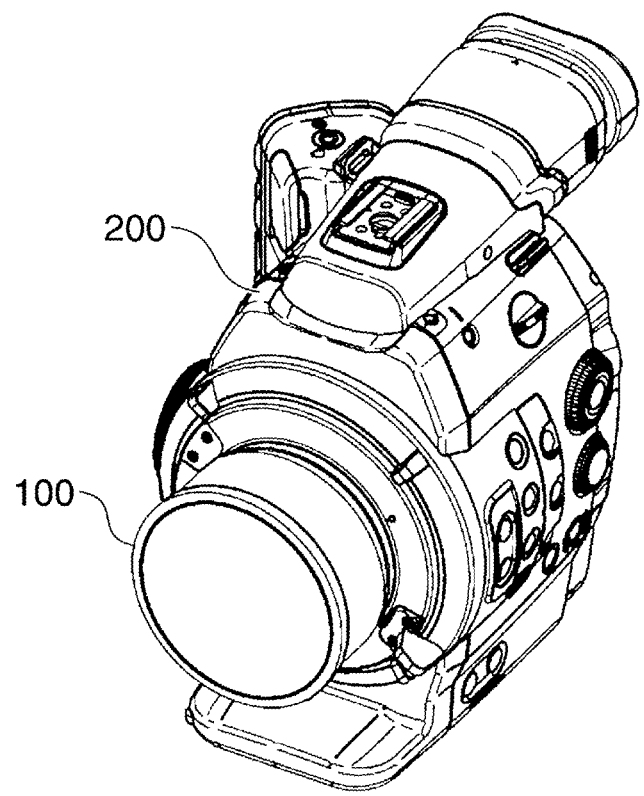
FIG. 1 is a front perspective view showing an external appearance of an image pickup apparatus in which an interchangeable lens is mounted to an image pickup apparatus body having a lens mount according to a first embodiment of this invention.
Figure 2:
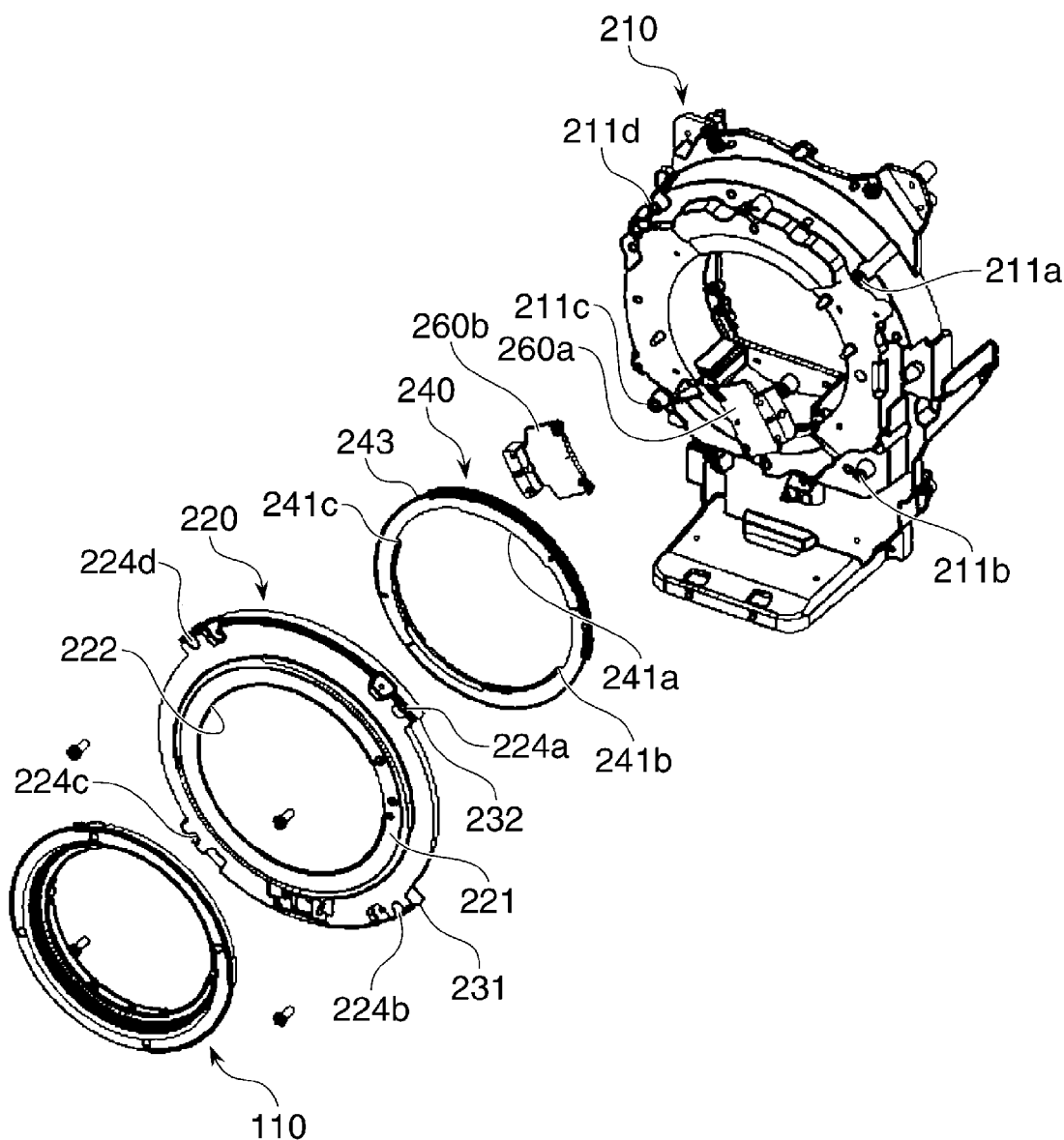
FIG. 2 is an exploded front perspective view showing an essential part of the lens mount of the image pickup apparatus body.
Figure 3:
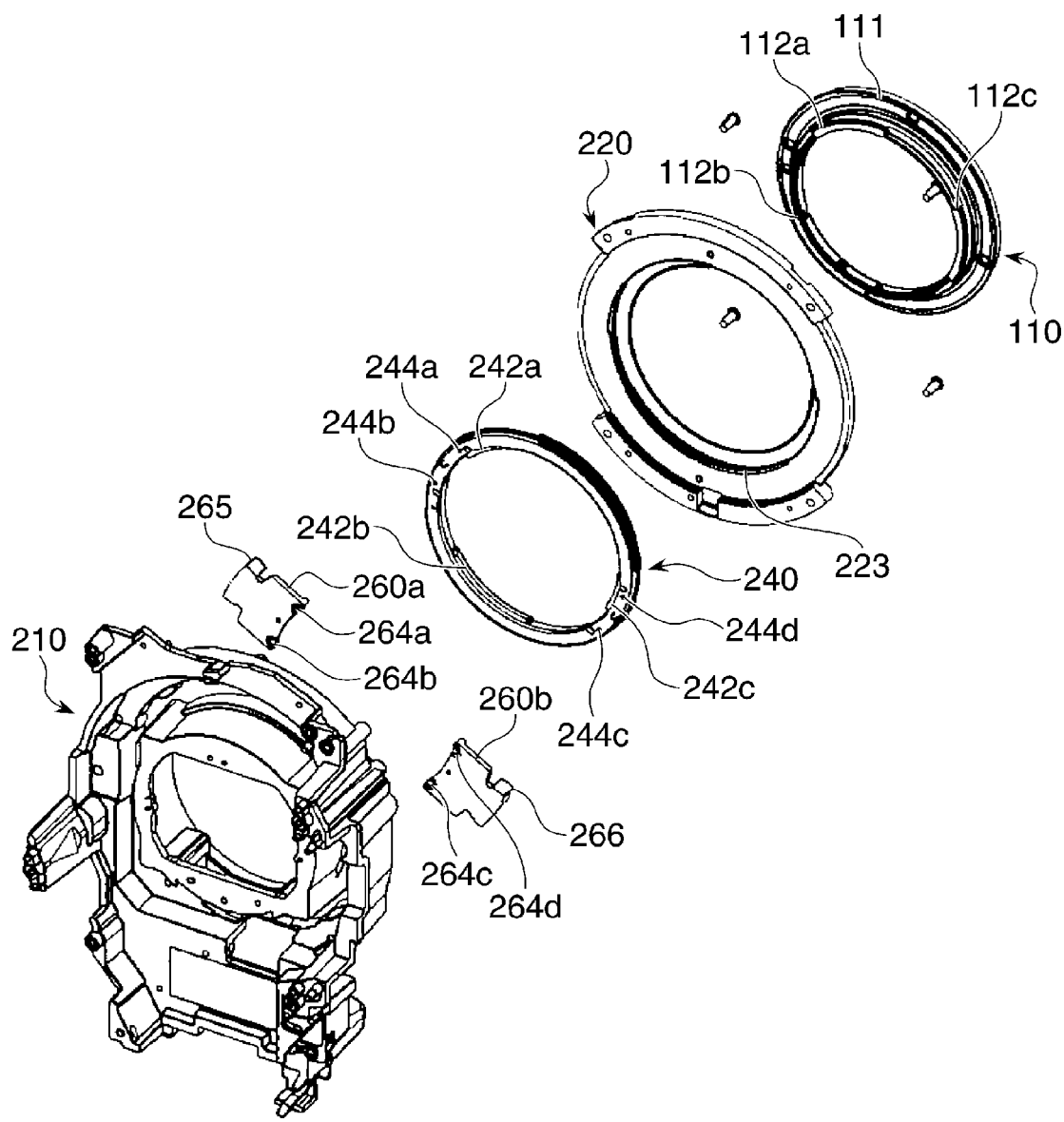
FIG. 3 is an exploded rear perspective view showing the essential part of the lens mount.
Figure 4:
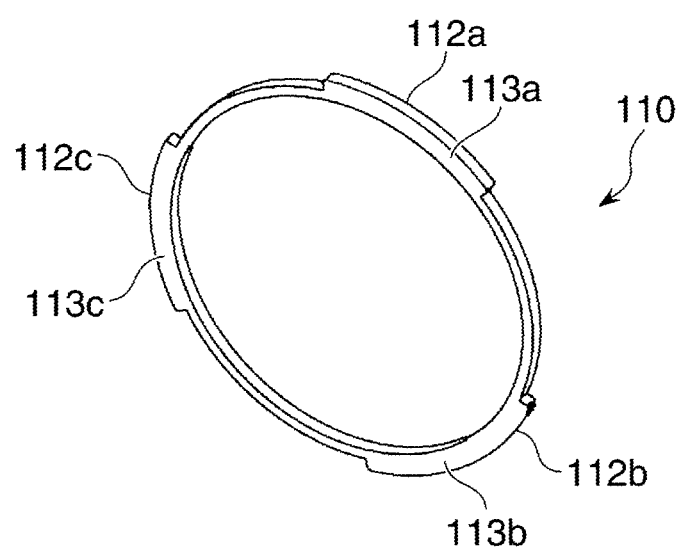
FIG. 4 is an enlarged front perspective view showing a part of a mount portion of the interchangeable lens.

FIG. 1 shows in front perspective view an external appearance of an image pickup apparatus in which an interchangeable lens is mounted to an image pickup apparatus body having a lens mount according to a first embodiment of this invention. In FIG. 1, reference numerals 100, 200 denote the interchangeable lens and the image pickup apparatus body, respectively. FIGS. 2 and 3 show an essential part of the lens mount in exploded perspective views as seen from the front and rear sides of the image pickup apparatus body 200, respectively. FIG. 4 shows a part of a mount portion of the interchangeable lens 100 in front perspective view.

The interchangeable lens 100 has a mount portion 110 of bayonet structure. The mount portion 110 has a lens-side mount face 111 and bayonet pawls 112a-112c as shown in FIG. 3, and is configured to be mounted to and dismounted from a lens mount that is provided on a front face of the image pickup apparatus body 200. As shown in FIG. 4, the bayonet pawls 112a-112c have bayonet pawl contact faces 113a-113c, respectively.

The lens mount of the image pickup apparatus body 200 mainly includes a first fixed portion 210, a stationary mount portion 220, a movable mount portion 240, and arm portions 260a, 260b.

The first fixed portion 210 has first fastened portions 211a-211d each formed with a female thread, and is fixed to a frame (not shown) of the image pickup apparatus body 200.

The stationary mount portion 220 has a body-side mount face 221 disposed for contact with the lens-side mount face 111 when the interchangeable lens 100 is mounted to the image pickup apparatus body 200, an opening 222 into which the bayonet pawls 112a-112c of the interchangeable lens 100 are inserted, a female screw portion (first screw portion) 223 formed around an optical axis, through holes 224a-224d, and first and second abutment faces 231, 232.

The stationary mount portion 220 is fixed to the first fixed portion 210 by inserting screws into the through holes 224a-224d and fastening the screws to the first fastened portions 211a-211d of the first fixed portion 210.

The movable mount portion 240 has pawls 241a-241c having pawl contact faces 242a-242c configured for abutment with respective ones of the bayonet pawl contact faces 113a-113c of the bayonet pawls 112a-112c of the interchangeable lens 100, a male screw portion (second screw portion) 243 configured for engagement with the female screw portion 223 of the stationary mount portion 220, and fastened portions 244a-244d each formed with a female thread.

The arm portion 260a has through holes 264a, 264b and an abutment face 265. The arm portion 260b has through holes 264c, 264d and an abutment face 266. The arm portions 260a, 260b are provided in an area between the first fixed portion 210 and the stationary mount portion 220 to project toward the movable mount portion 240, and fixed to the movable mount portion 240 by inserting screws into the through holes 264a-264d and fastening the screws to the fastened portions 244a-244d of the movable mount portion 240.

Figure 5A:
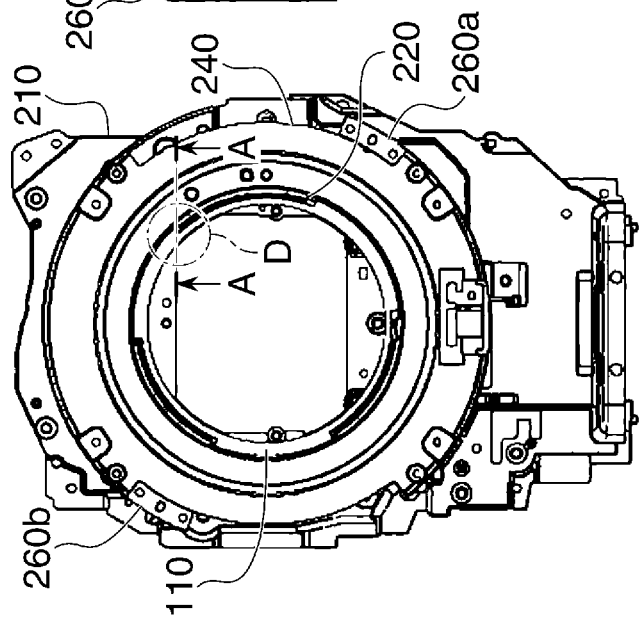
FIGS. 5A to 5C are front views showing how lens mount elements operate when the interchangeable lens is mounted to the image pickup apparatus body.
Figure 5B:
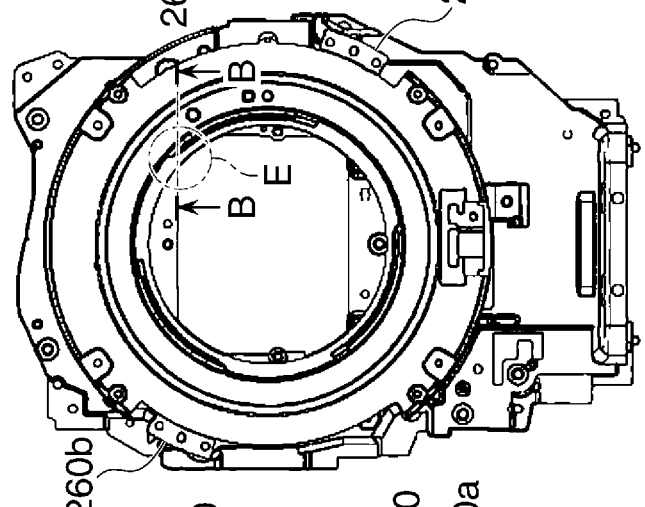
Figure 5C:
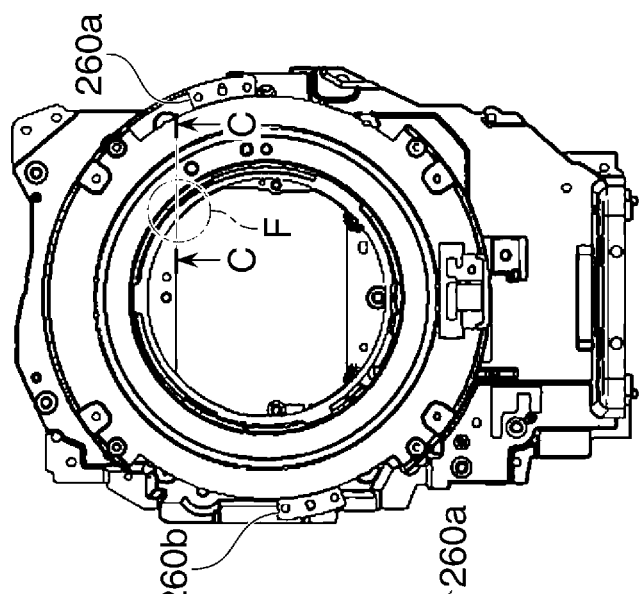

FIGS. 5A to 5C show, in front views, how elements of the lens mount of the image pickup apparatus body 200 operate when the interchangeable lens 100 is mounted to the image pickup apparatus body 200.

FIG. 5A shows a state where the bayonet pawls 112a-112c of the interchangeable lens 100 do not overlap the pawls 241a-241c of the movable mount portion 240 of the image pickup apparatus body 200 as viewed in the optical axis direction and where the interchangeable lens 100 can be mounted to and dismounted from the image pickup apparatus body 200. In this state, the abutment face 266 of the arm portion 260b is in abutment with the second abutment face 232 of the stationary mount portion 220 in the lens mount of the image pickup apparatus body 200.

FIG. 5B shows a state where the movable mount portion 240 has been rotated anticlockwise about the optical axis relative to the stationary mount portion 220 as seen from front of the image pickup apparatus body 200 and where the bayonet pawls 112a-112c and the pawls 241a-241c overlap one another as viewed in the optical axis direction.

FIG. 5C shows a state where the movable mount portion 240 has been rotated until the pawl contact faces 242a-242c and the bayonet pawl contact faces 113a-113c are brought in abutment with one another and where the interchangeable lens 100 has been mounted to the image pickup apparatus body 200. In this state, the abutment face 265 of the arm portion 260a is in abutment with the first abutment face 231 of the stationary mount portion 220.

Figure 6A:
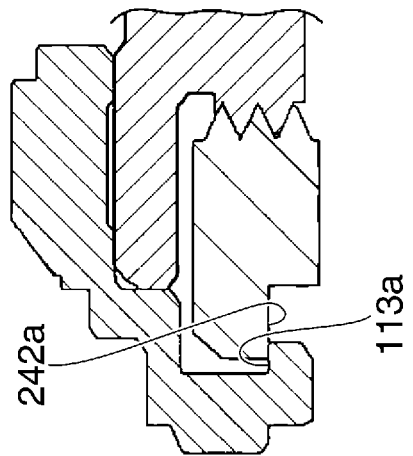
FIGS. 6A to 6C are section views as seen from arrows A, B, and C, respectively, which are shown in FIGS. 5A to 5C.
Figure 6B:
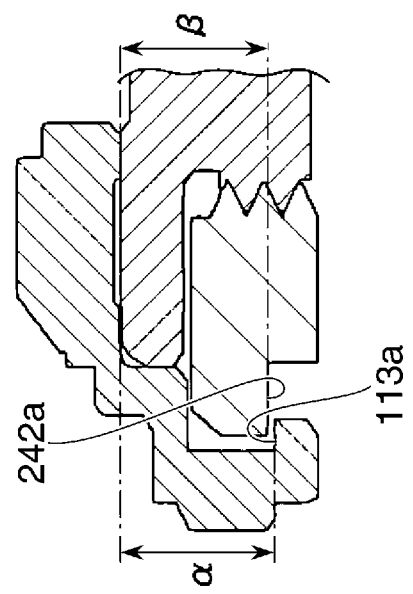
Figure 6C:
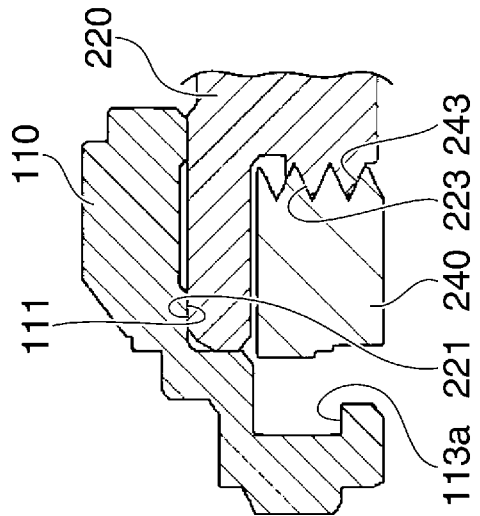
Figure 7A:
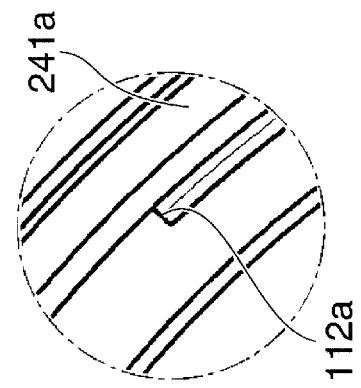
FIGS. 7A to 7C are enlarged views showing a D part, an E part, and an F part, respectively, which are shown in FIGS. 5A to 5C.
Figure 7B:
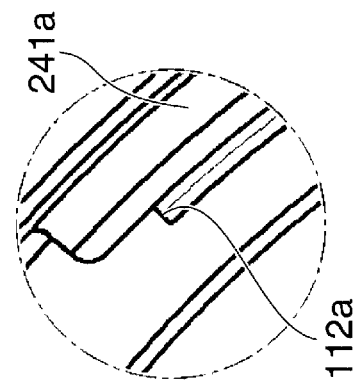
Figure 7C:
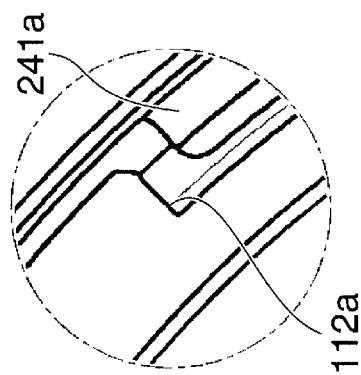

FIGS. 6A to 6C are section views as seen from arrows A, B, and C, respectively, which are shown in FIGS. 5A to 5C. FIGS. 7A to 7C show in enlarged views a D part, an E part, and an F part, respectively, which are shown in FIGS. 5A to 5C.

In FIG. 6B, symbol $\alpha$ denotes a distance from the mount face 111 to the bayonet pawl contact face 113a of the interchangeable lens 100, and symbol $\beta$ denotes a distance between the body-side mount face 221 of the stationary mount portion 220 and the pawl contact face 242a of the movable mount portion 240.

In the state of FIG. 6A, the bayonet pawls 112a-112c of the interchangeable lens 100 are inserted into the opening 222 of the stationary mount portion 220 of the image pickup apparatus body 200 whereby the interchangeable lens 100 is fitted into the image pickup apparatus body 200, and the mount face 111 of the interchangeable lens 100 is in abutment with the mount face 221 of the image pickup apparatus body 200. In this state, as shown in FIG. 7A, the bayonet pawls 112a-112c are not in engagement with the pawls 241a-241c.

In the state of FIG. 6B, with rotation of the movable mount portion 240 having the male screw portion 243 that engages with the female screw portion 223 of the stationary mount portion 220, the pawls 241a-241c of the movable mount portion 240 move toward the first fixed portion 210 in the optical axis direction.

In the state of FIG. 6C, the movable mount portion 240 has completed its rotation. The pawl contact faces 242a-242c of the pawls 241a-241c of the movable mount portion 240 are in engagement with the bayonet pawl contact faces 113a-113c of the bayonet pawls 112a-112c of the interchangeable lens 100. In other words, the interchangeable lens 100 is fixed so as not to be rattled relative to the image pickup apparatus body 200.

In the following, the lens mount according to this embodiment will be described in comparison with a conventional lens mount. A screw type lens mount requires that faces (which correspond to the pawl contact faces 242a-242c and the bayonet pawl contact faces 113a-113c that are in abutment with one another as shown in FIG. 6C) be provided closer to the interchangeable lens 100 than to the body-side mount face 221, and the image pickup apparatus body 200 becomes large in size accordingly. In the case of an ordinary bayonet type lens mount, the distance α from the lens-side mount face 111 to the bayonet pawl contact face 113a is larger than the distance β between the body-side mount face 221 and the pawl contact face 242a of the movable mount portion 240, and there are gaps between the pawl contact faces 242a-242c of the movable mount portion 240 and the bayonet pawl contact faces 113a-113c of the interchangeable lens 100. To compensate for these gaps, spring members are used. As a result, the interchangeable lens is rattled by an amount of flexure of the spring members.

On the contrary, the lens mount of this embodiment is configured to fix the interchangeable lens 100 to the image pickup apparatus body 200 at a position closer to the first fixed portion 210 than to the body-side mount face 221 (i.e., at a position inside the image pickup apparatus body 200). The lens mount of this embodiment is therefore advantageous in that the image pickup apparatus body 200 can be made compact in size as compared to the screw type lens mount. Furthermore, unlike the conventional bayonet type lens mount, there are no gaps between the pawl contact faces 242a-242c of the movable mount portion 240 and the bayonet pawl contact faces 113a-113c of the interchangeable lens 100, and accordingly the interchangeable lens 100 is advantageously prevented from being rattled.

In this embodiment, the male screw portion 243 of the movable mount portion 240 and the female screw portion 223 of the stationary mount portion 220 can each be formed into a left-hand screw or a right-hand screw having a screw feed amount of 2 mm and a screw pitch of 1 mm, for example. If the direction of rotation for mounting the interchangeable lens 100 is clockwise relative to the image pickup apparatus body 200, the male screw portion 243 and the female screw portion 223 are each formed into a left-hand screw. If the direction of rotation for mounting the interchangeable lens 100 is anticlockwise, each screw portion is formed into a right-hand screw.

The larger the screw feed amount is, the larger movement distance of the movable mount portion 240 in the optical axis direction can be obtained with a small amount of rotary operation of the movable mount portion 240. In other words, the amount of movement of the movable mount portion 240 relative to the amount of rotary operation increases with the increase of the screw feed amount. Even if the distance α between the lens-side mount face 111 and the bayonet pawl contact face 113a varies due to individual difference of the interchangeable lens 100, it is possible to move the movable mount portion 240 for a distance larger than the variation in distance α with a small amount of rotary operation of the movable mount portion 240, whereby the interchangeable lens 100 can be securely fastened and fixed to the image pickup apparatus body 200. On the other hand, when the screw feed amount is small, a fastening axial force becomes large. To increase a fastening force for mounting the interchangeable lens 100 to the image pickup apparatus body 200, the screw feed amount must be made small. The screw feed amount of the male screw portion 243 and female screw portion 223 can properly be set so as to obtain the desired characteristic, as described above.

By increasing the number of screw threads of the male screw portion 243 of the movable mount portion 240 and by increasing the number of screw threads of the female screw portion 223 of the stationary mount portion 220, it is possible to avoid stress concentration on the male screw portion 243 and on the female screw portion 223.

To achieve reliable fastening and to obtain a large fastening force in the lens mount that is disposed in a narrow space, it is preferable to use multiple thread screws that are small in screw pitch and large in screw feed amount. It should be noted that in this embodiment, sliding grease is applied between the male screw portion 243 and the female screw portion 223 to suppress roughness in sliding rotation of the male screw portion 243 and the female screw portion 223, whereby durability and slidability can be improved.

Figure 8:
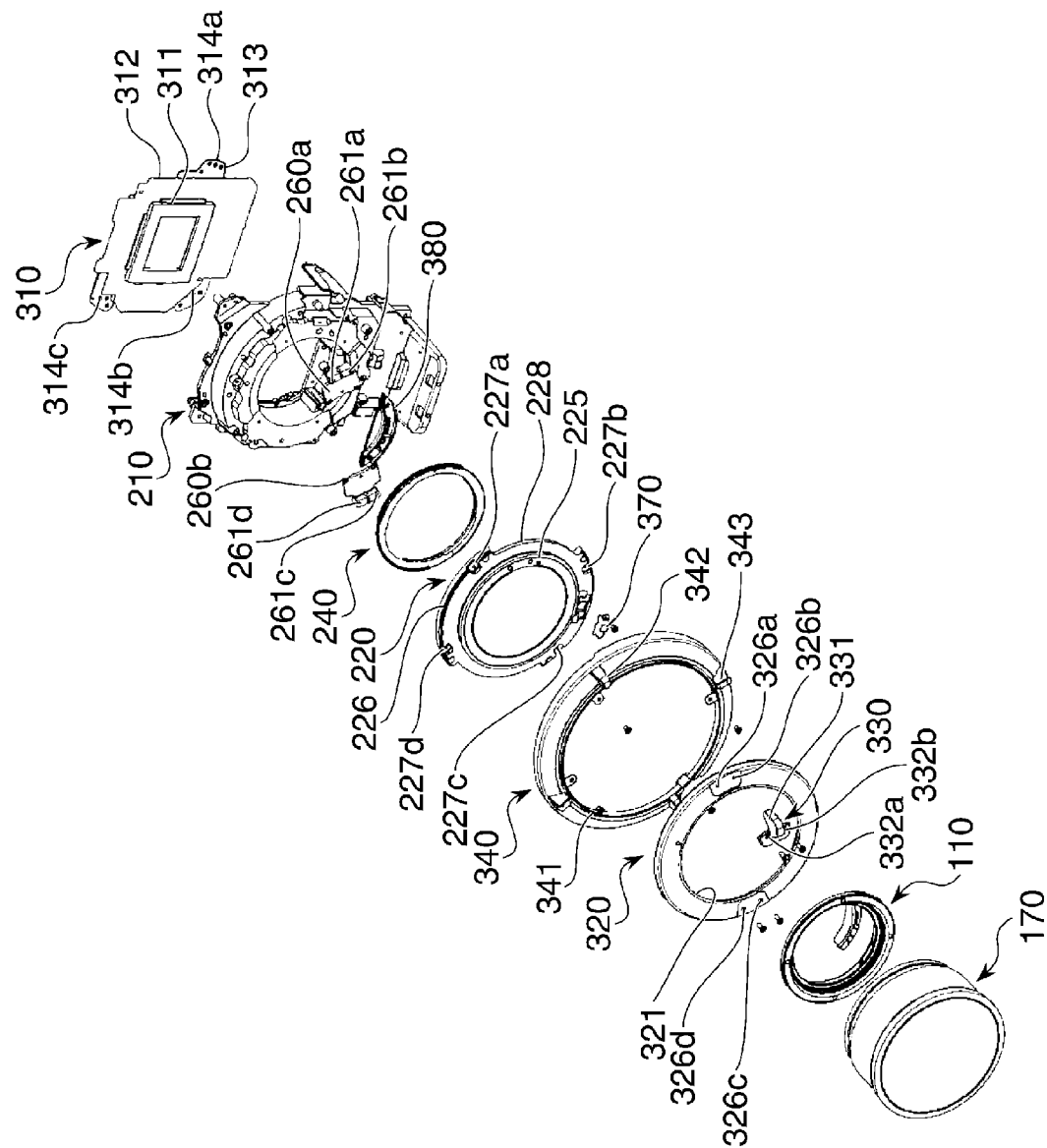
FIG. 8 is an exploded front perspective view showing the entire construction of the lens mount of the image pickup apparatus body.
Figure 9:
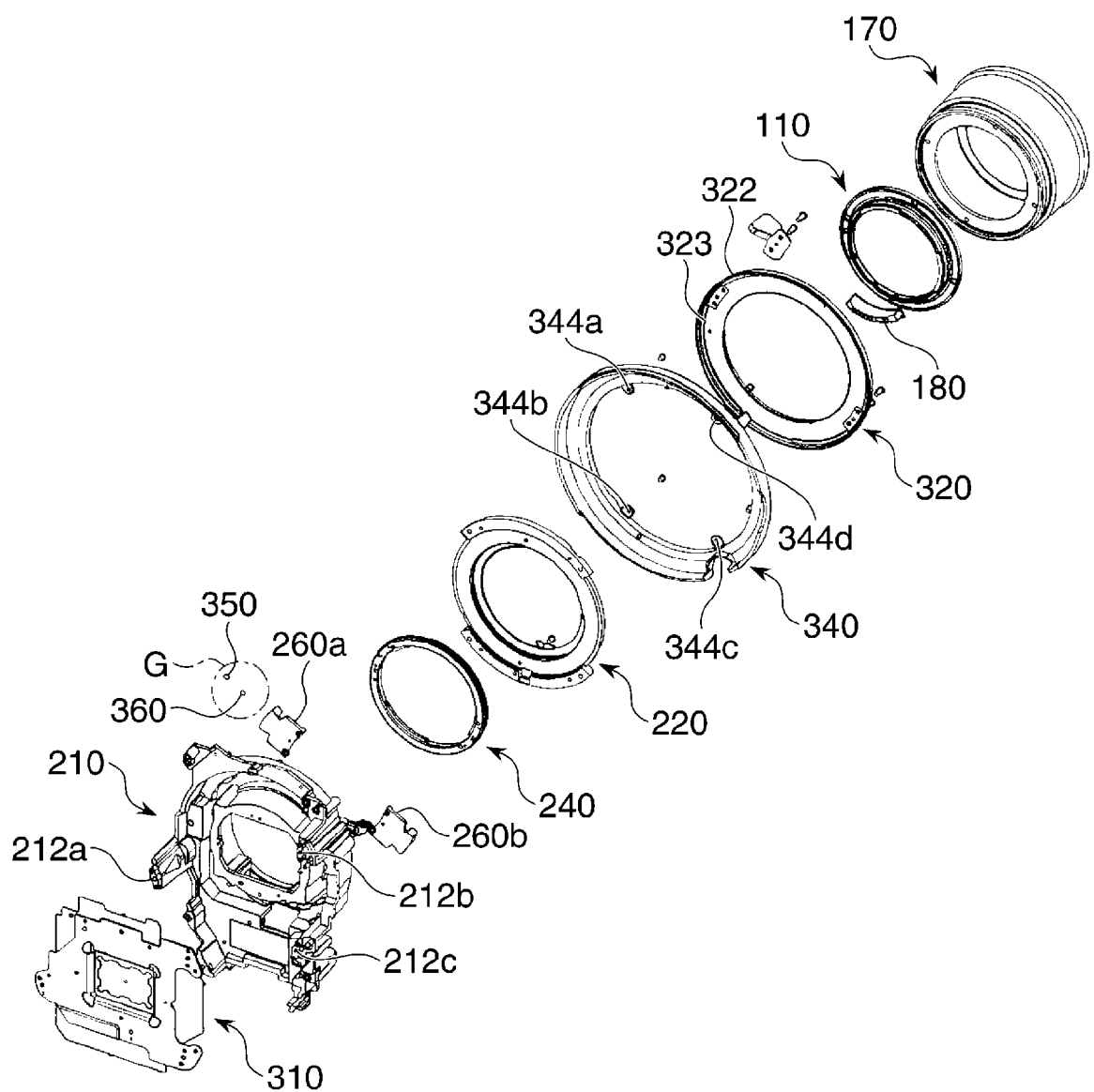
FIG. 9 is an exploded rear perspective view showing the entire construction of the lens mount.
Figure 10:
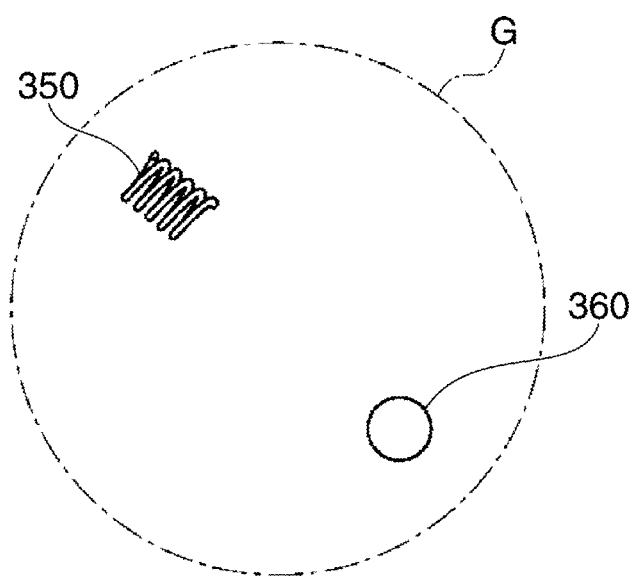
FIG. 10 is an enlarged view showing in detail a G part shown in FIG. 9.

Next, a description will be given of the entire construction of the lens mount in which functional parts are added to the above-described essential part of the lens mount. FIGS. 8 and 9 respectively show in exploded front and rear perspective views the entire construction of the lens mount of the image pickup apparatus body 200, and FIG. 10 shows in detail, in enlarged view, a G part shown in FIG. 9.

As shown in FIGS. 8 and 9, the interchangeable lens 100 has the above-described mount portion 110 and in addition has a lens barrel portion 170 and a communication contact portion 180. The lens mount of the image pickup apparatus body 200 has the above-described first fixed portion 210, stationary mount portion 220, movable mount portion 240, and arm portions 260a, 260b. In addition, the lens mount has an imaging element unit 310, ring portion 320, operating portion 330, second fixed portion 340, elastic member 350, spherical metal ball 360, rotation detection sensor 370, and communication contact portion 380.

The imaging element unit 310 has an imaging element 311 that converts light entering through the interchangeable lens 100 into an image signal, a circuit board 312 mounted with the imaging element 311, and a holder plate 313 that holds the circuit board 312 and that is formed with through holes 314a-314c.

The imaging element unit 310 is fixed to the first fixed portion 210 by inserting screws into the through holes 314a-

314c and fastening the screws to second fastened portions 212a-212c of the first fixed portion 210. At this time, a distance (flange back amount) between the imaging element 311 and the body-side mount face 221 of the stationary mount portion 220 is adjusted by inserting washers (not shown) between the holder plate 313 and the first fixed portion 210.

The ring portion 320 has an opening 321, an annular projection 322 formed at an outer periphery of the ring portion 320, a notched annular projection 323 provided to face an annular recess 226 (body-side guide portion) formed along the entire outer periphery of the stationary mount portion 220, and through holes 326a-326d. The ring portion 320 is fixed to the arm portions 260a, 260b by inserting screws into the through holes 326a-326d and fastening the screws to fastened portions 261a, 261b of the arm portion 260a and to fastened portions 261c, 261d of the arm portion 260b.

The opening 321 of the ring portion 320 is loosely fitted with a cylinder portion 225 (fitting portion) of the stationary mount portion 220, and the ring portion 320 is disposed for sliding engagement with and for rotation relative to the stationary mount portion 220. A gap between the ring portion 320 and the stationary mount portion 220 is narrow, thereby preventing intrusion of water droplet, dirt, and light through the gap. In other words, a drip-proof function, dustproof function, and light shield function can be achieved by the ring portion 320 and the stationary mount portion 220. It should be noted that the slidability and the drip-proof and dustproof functions can be enhanced by applying sliding grease to the gap between the ring portion 320 and the stationary mount portion 220.

The operating portion 330 has a finger engagement portion 331 and through holes 332a, 332b. The operating portion 330 is coupled through the arm portion 260a to the movable mount portion 240 by inserting screws into the through holes 332a, 332b and into the through holes 326a, 326b of the ring portion 320 and fastening the screws to the fastened portions 261a, 261b of the arm portion 260a. A photographer can rotatably operate the movable mount portion 240 by rotating the operating portion 330 while holding a finger on the finger engagement portion 331. It should be noted that the operating portion 330 can be disposed on a side close to the through holes 326c, 326d of the ring portion 320.

The second fixed portion 340 has an annular recess 341 for engagement with the annular projection 322 of the ring portion 320, first and second finger rest portions 342, 343 that are provided so as not to interfere with a locus of rotation of the operating portion 330, and through holes 344a-344d. By engaging the annular recess 341 with the annular projection 322, an engagement area increases, and a gap between the ring portion 320 and the second fixed portion 340 is bent in shape. It is therefore possible to prevent intrusion of water droplet, foreign matter (such as dirt), and light through the gap.

The second fixed portion 340 is fixed to the stationary mount portion 220 by inserting screws into the through holes 344a-344d and fastening the screws to fastened portions 227a-227d of the stationary mount portion 220.

In a state where the interchangeable lens 100 is mounted to the image pickup apparatus body 200, the communication contact portion 180 of the interchangeable lens 100 is in contact with the communication contact portion 380 of the image pickup apparatus body 200, whereby electric power is supplied from the image pickup apparatus body 200 to the interchangeable lens 100 and a control signal can be exchanged between the interchangeable lens 100 and the image pickup apparatus body 200.

The rotation detection sensor 370 switches on/off the communication between the communication contact portions 180, 380 in accordance with the rotary position of the notched annular projection 323 of the ring portion 320 fastened to the movable mount portion 240. A description of functions of the elastic member 350 and the spherical metal ball 360 will be given later.

Figure 11A:
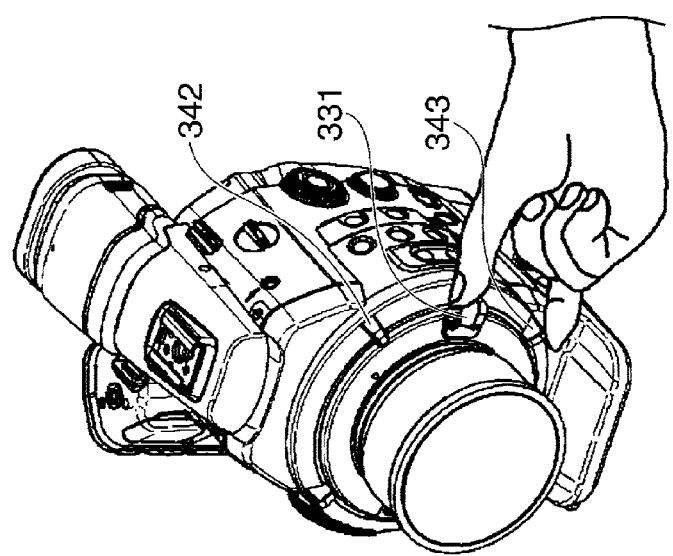
FIGS. 11A and 11B are perspective views respectively showing operations to mount and dismount the interchangeable lens to and from the image pickup apparatus body.
Figure 11B:
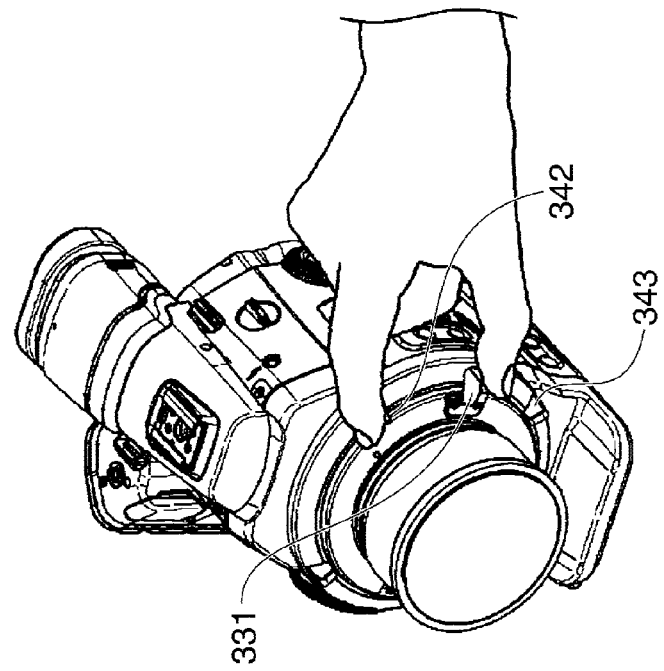

FIGS. 11A and 11B respectively show in perspective views operations to mount and dismount the interchangeable lens 100 to and from the image pickup apparatus body 200.

To mount the interchangeable lens 100 to the image pickup apparatus body 200, if a user operates to rotate the operating portion 330 while holding only the finger engagement portion 331, a rotary force is applied also to the image pickup apparatus body 200. To obviate this, the user must rotatably operate the operating portion 330 while holding the image pickup apparatus body 200.

If, as shown in FIG. 11A, the user rotatably operates the operating portion 330 with a finger held on the finger engagement portion 331 of the operating portion 330 while placing another finger on the first finger rest portion 342 of the second fixed portion 340, a force acts on the first finger rest portion 342, which is opposite in direction from a force acting on the finger engagement portion 331. As a result, it becomes unnecessary to perform a rotary operation while holding the image pickup apparatus body 200. Since the operation to rotate the operating portion 330 is performed by handgrip force, the resultant fastening force becomes strong as compared to a case where the rotary operation is performed by holding only the finger engagement portion 331, and therefore the image pickup apparatus body 200 and the interchangeable lens 100 can be strongly fastened together.

To detach the interchangeable lens 100 from the image pickup apparatus body 200, the user rotatably rotates the operating portion 330 with a finger held on the finger engagement portion 331 while placing another finger on the second finger rest portion 343, as shown in FIG. 11B. This makes it unnecessary for the user to rotatably operate the operating portion 330 while holding the image pickup apparatus body 200.

Figure 12:
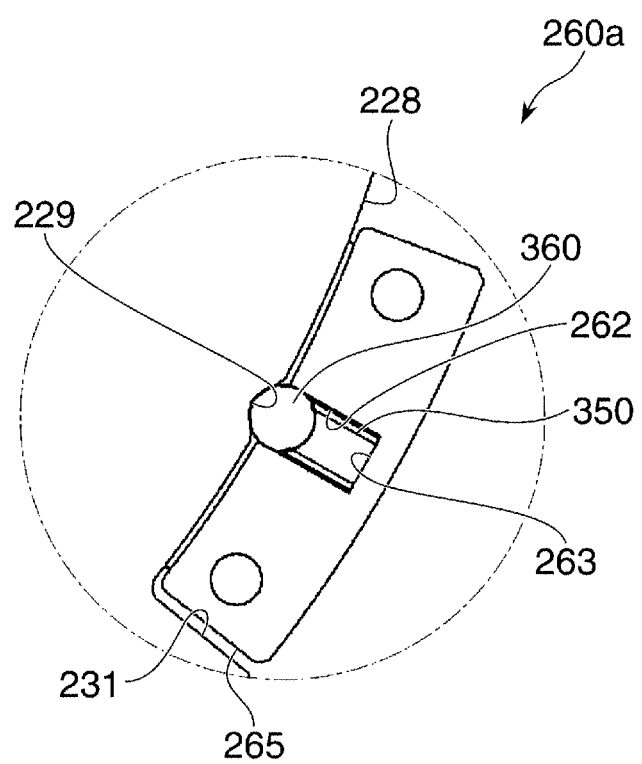
FIG. 12 is an enlarged view showing an arm portion of the lens mount in cross section perpendicular to an optical axis.

FIG. 12 shows the arm portion 260a of the lens mount in cross section perpendicular to the optical axis. The arm portion 260a has a cylindrical recess 262 in which the elastic member 350 such as a compression coil spring is slidably disposed, and a bottom face 263 configured for abutment with one end of the elastic member 350. At another end of the elastic member 350, the spherical metal ball 360 is disposed. The spherical metal ball 360 is urged by the elastic member 350 toward the stationary mount portion 220 and brought in press-contact with a side face 228 (see FIG. 8) of the stationary mount portion 220.

In FIG. 12, reference numeral 229 denotes a notch formed in the side face 228 of the stationary mount portion 220. The spherical metal ball 360 is fitted into the notch 229 of the stationary mount portion 220 in a state where the bayonet pawls 112a-112b of the interchangeable lens 100 do not overlap the pawls 241a-241c of the movable mount portion 240 as viewed in the optical axis direction and where the interchangeable lens 100 can be mounted and dismounted.

On the other hand, in a state where the bayonet pawls 112a-112b overlap the pawls 241a-241c as viewed in the optical axis direction, the spherical metal ball 360 rides onto the side face 228 of the stationary mount portion 220.

With the above-described movement of the spherical metal ball 360, a click feeling is provided. The spherical metal ball 360 remains fitted in the notch 229 of the stationary mount portion 220 unless a certain load is applied to the spherical metal ball 360. This makes it easy for the user to align the movable mount portion 240 to a position where the interchangeable lens 100 can be mounted and dismounted.

It should be noted that the spherical metal ball 360 must be fitted into the notch 229 before the first abutment face 231 of the stationary mount portion 220 and the abutment face 265 of the arm portion 260a are brought in abutment with each other. In this embodiment, the notch 229 is provided at a position where the interchangeable lens 100 can be mounted and dismounted. However, this is not limitative. To generate a holding force, a notched groove can be provided at a location other than the position where the interchangeable lens 100 can be mounted and dismounted.

FIGS. 13A to 13E show in front views a change in operation state of the lens mount observed when the interchangeable lens 100 is mounted to the image pickup apparatus body 200. It should be noted that FIGS. 13A to 13E only illustrate a part of the mount portion 110 of the interchangeable lens 100, which is shown in FIG. 4. In FIGS. 13A to 13E, symbols $\theta a$ to $\theta e$ denote angles of rotation of the movable mount portion 240 relative to the stationary mount portion 220 (hereinafter, simply referred to as the rotation angle).

Figure 13:
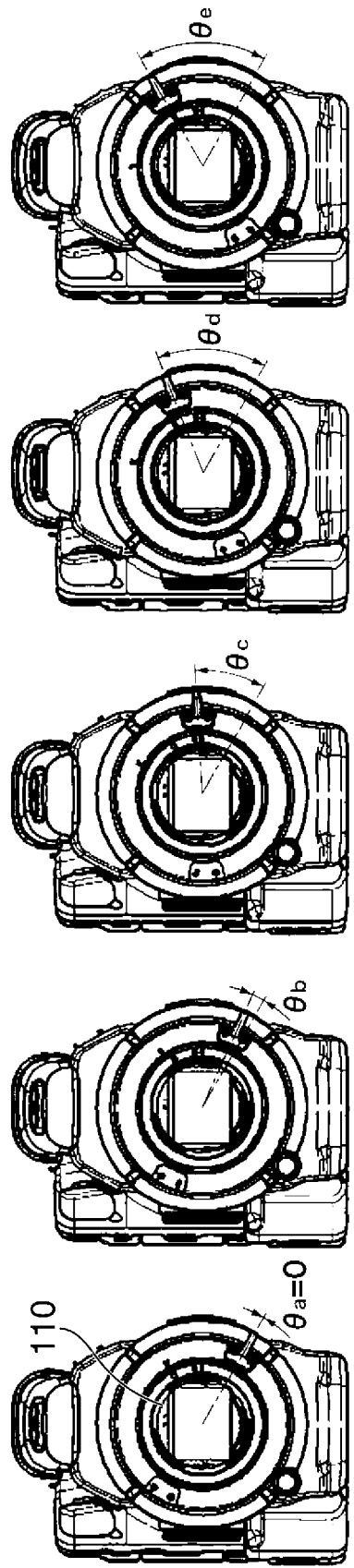
FIGS. 13A to 13E are front views showing a change in operation state of the lens mount observed when the interchangeable lens is mounted to the image pickup apparatus body.

FIG. 13A shows a state where the bayonet pawls 112a-112c of the interchangeable lens 100 do not overlap the pawls 241a-241c of the movable mount portion 240 as viewed in the optical axis direction and where the interchangeable lens 100 can be mounted to and dismounted from the image pickup apparatus body 200. In this state, the spherical metal ball 360 is fitted in the notch 229. It is assumed that the rotation angle $\theta a$ shown in FIG. 13A is equal to 0 degree.

FIG. 13B shows a state where the rotation angle of the movable mount portion 240 has changed from $\theta a$ to $\theta b$ according to a rotary operation of the operating portion 330 and where the bayonet pawl contact faces 113a-113c of the bayonet pawls 112a-112c of the interchangeable lens 100 and the pawl contact faces 242a-242c of the pawls 241a-241c of the movable mount portion 240 start to overlap one another as viewed in the optical axis direction. In this state, the interchangeable lens 100 never be detached from the image pickup apparatus body 200 since the bayonet pawls 112a-112c of the interchangeable lens 100 and the pawls 241a-241c of the movable mount portion 240 overlap with one another.

FIG. 13C shows a state where the rotation angle of the movable mount portion 240 has changed from $\theta b$ to $\theta c$ according to a further rotary operation of the operating portion 330 and where the bayonet pawl contact faces 113a-113c and the pawl contact faces 242a-242c are in contact with one another with a minimum engagement amount. The rotation angle $\theta c$ represents an angle where the contact faces 113a-113c and the contact faces 242a-242c are in contact with one another in a state where the distance $\alpha$ (see FIG. 6) from the mount face 111 of the interchangeable lens 100 to the bayonet pawl contact face 113a is minimum and the distance $\beta$ (see FIG. 6) between the body-side mount face 221 of the stationary mount portion 220 and the pawl contact face 242a of the movable mount portion 240 is minimum. At the rotation angle $\theta c$, an amount of engagement between the contact faces becomes minimum.

FIG. 13D shows a state where the rotation angle of the movable mount portion 240 has changed from $\theta c$ to $\theta d$ according to a further rotary operation of the operating portion 330 and where the bayonet pawl contact faces 113a-113c and the pawl contact faces 242a-242c are in contact with one another with a maximum amount of engagement. The rotation angle $\theta d$ represents an angle where the contact faces 113a-113c and the contact faces 242a-242c are in contact with one another in a state where the distance $\alpha$ is maximum and the distance $\beta$ is maximum. At the rotation angle $\theta d$, an amount of engagement between the contact faces becomes maximum.

FIG. 13E shows a state that the rotation angle of the movable mount portion 240 has changed from $\theta d$ to $\theta e$ according to a further rotary operation of the operating portion 330 and where the second abutment face 232 of the stationary mount portion 220 and the abutment face 266 of the arm portion 260b are in contact with one another. In this state, any of the mount portion 110 of the interchangeable lens 100 and the stationary and movable mount portions 220, 240 of the image pickup apparatus body 200 is deformed. To prevent each of these mount portions from being deformed beyond an elastic deformation area, the second abutment face 232 of the stationary mount portion 220 and the abutment face 266 of the arm portion 260b are made in contact with each other to restrict an amount of rotation of the movable mount portion 240 relative to the stationary mount portion 220, thereby preventing the mount portions from being damaged due to deformation thereof. It should be noted that the rotation angle $\theta e$ is made equal to or larger than the rotation angle $\theta d$ in order to securely fasten the interchangeable lens 100 and the image pickup apparatus body 200 together.

As apparent from the foregoing description, the lens mount of this embodiment makes it possible to easily mount the interchangeable lens 100 of bayonet type lens mount to the image pickup apparatus body 200 and prevent the mounted interchangeable lens 100 from being rattled.

Second Embodiment

Figure 14:
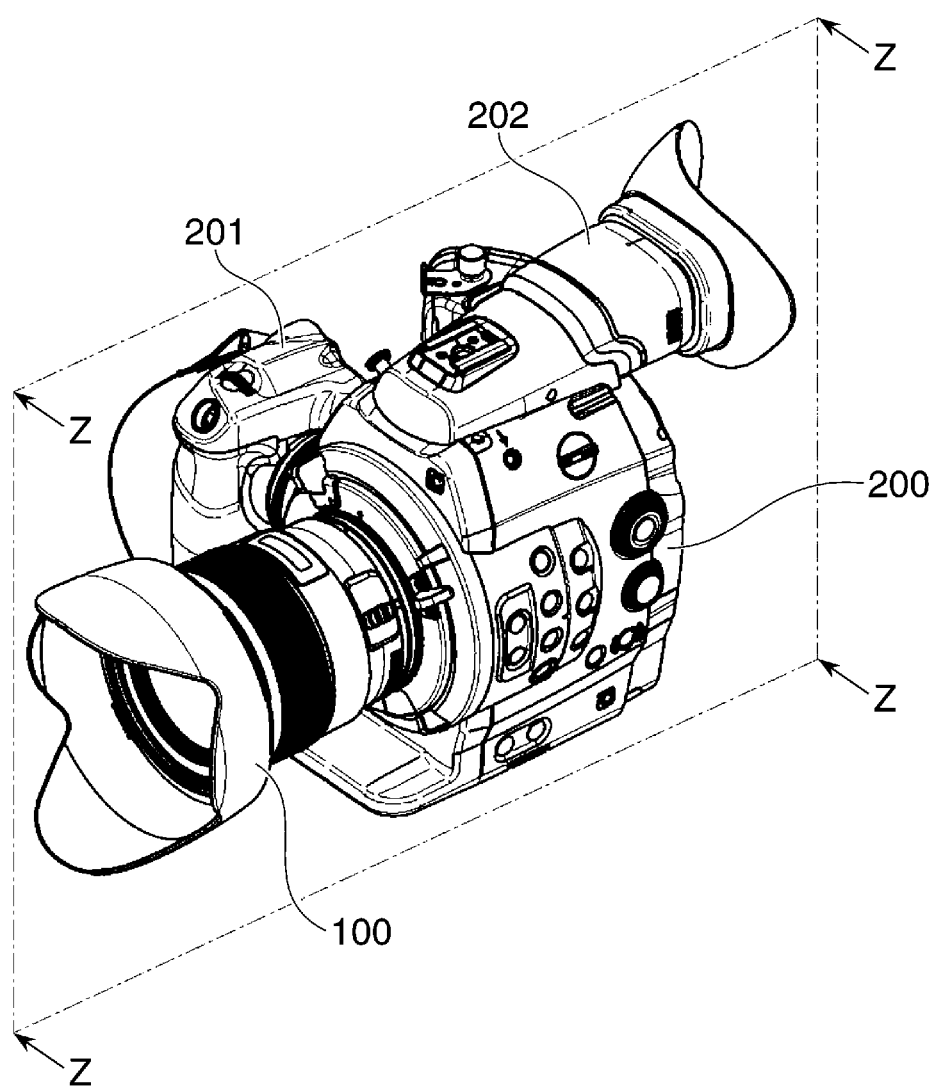
FIG. 14 is a perspective view showing an external appearance of an image pickup apparatus having a lens mount according to a second embodiment of this invention.

FIG. 14 shows in perspective view an external appearance of an image pickup apparatus having a lens mount according to a second embodiment of this invention. The image pickup apparatus includes an image pickup apparatus body 200 and an interchangeable lens 100 that can be mounted to and dismounted from the image pickup apparatus body 200 and that is fixed to the image pickup apparatus body 200 by a lock mechanism. The lock mechanism of the image pickup apparatus of this embodiment is the same as that of the first embodiment previously described with reference to FIGS. 2 to 7, and therefore a description of the lock mechanism will be omitted.

As shown in FIG. 14, the image pickup apparatus body 200 has a grip portion 201 for use by a user to hold the image pickup apparatus at the time of photographing or the like, and a finder 202 for use by the user to view a photographed image, information about photographing conditions, etc.

Figure 15:
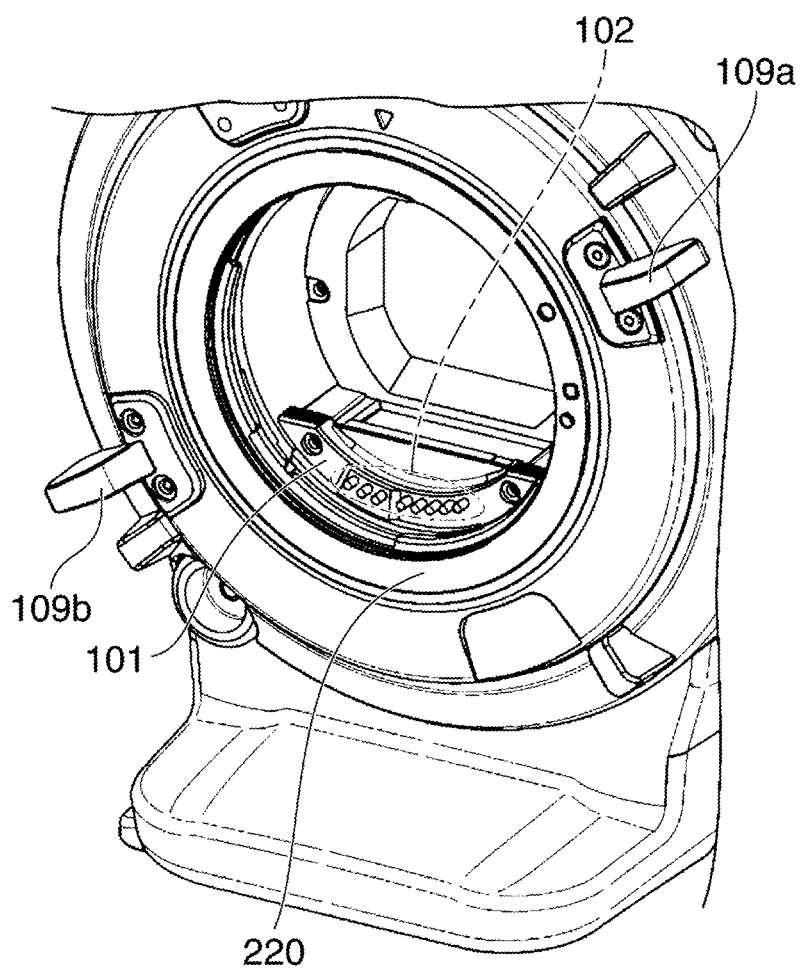
FIG. 15 is a fragmentary external perspective view showing a stationary mount portion and its peripheral elements of the lens mount of the image pickup apparatus body.

FIG. 15 shows in external perspective view the stationary mount portion of the lens mount of the image pickup apparatus body 200.

The lens mount of the image pickup apparatus body 200 has the stationary mount portion 220 and a mount contact terminal unit 101 disposed inside the opening of the stationary mount portion 220 and having mount contact terminal pins 102. In a state where the interchangeable lens 100 is mounted to the image pickup apparatus body 200, the mount contact terminal pins 102 serving as a body-side contact terminal portion are in contact with lens contact terminal pieces 104 (see FIG. 16) serving as a lens-side contact terminal portion of the interchangeable lens 100, thereby enabling signal communication between the interchangeable lens 100 and the image pickup apparatus body 200.

It should be noted that the mount contact terminal pins 102 are urged by an elastic member (not shown) such as a spring toward a side where the interchangeable lens 100 is mounted, and made slidable in the optical axis direction by an amount of deformation (amount of expansion/contraction) of the elastic member. In stead of making the mount contact terminal pins 102 slidable, the lens contact terminal pieces 104 of the interchangeable lens 100 can be configured to be slidable.

In FIG. 15, reference numerals 109a, 109b denote rotary operation members.

Figure 16:
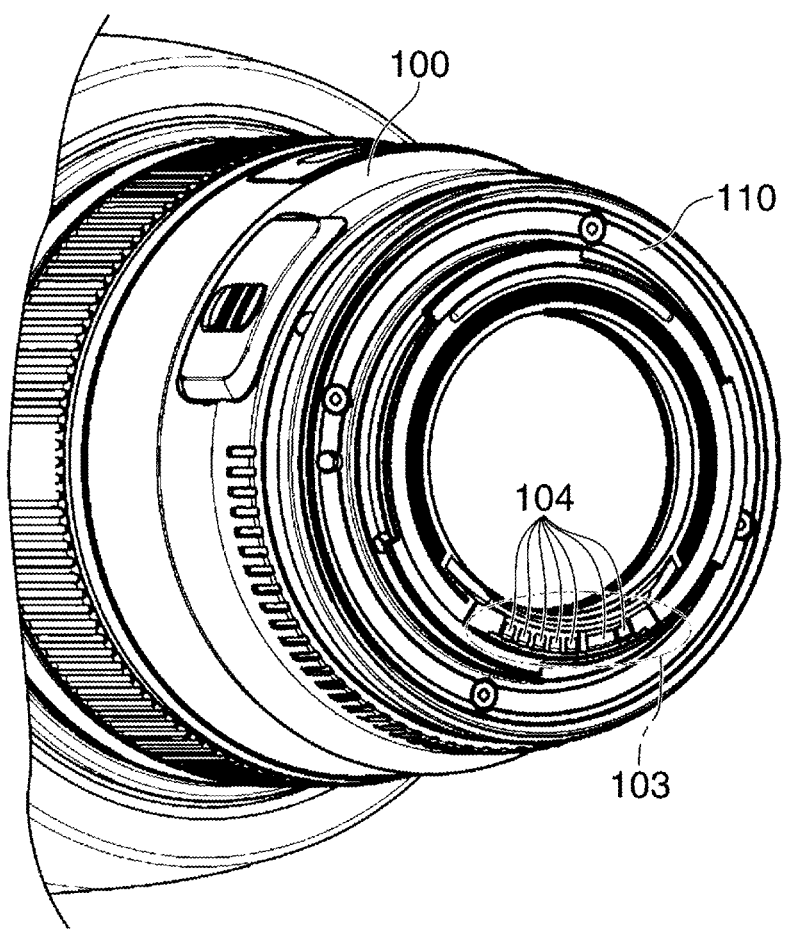
FIG. 16 is a fragmentary external perspective view showing a lens-side mount portion provided in the interchangeable lens and detachably mounted to the stationary mount portion of the image pickup apparatus body.

FIG. 16 shows in external perspective view the lens-side mount portion 110 provided in the interchangeable lens 100 and detachably mounted to the stationary mount portion 220 of the image pickup apparatus body 200. The lens-side mount portion 110 has an inner periphery provided with a lens contact terminal unit 103 having the aforementioned lens contact terminal pieces 104.

To mount the interchangeable lens 100 to the image pickup apparatus body 200, the lens-side mount portion 110 of the interchangeable lens 100 is fitted into the stationary mount portion 220 of the image pickup apparatus body 200. Subsequently, the rotary operation members 109a, 109b (see FIG. 15) coupled to the arm portions 260a, 260b (see FIGS. 2 and 3) fixed to the movable mount portion 240 are rotated to rotate the movable mount portion 240. As a result, the lens-side mount portion 110 is brought in close contact and engagement with the stationary mount portion 220, whereby the mounting of the interchangeable lens 100 to the image pickup apparatus body 200 is completed.

Figure 17A:
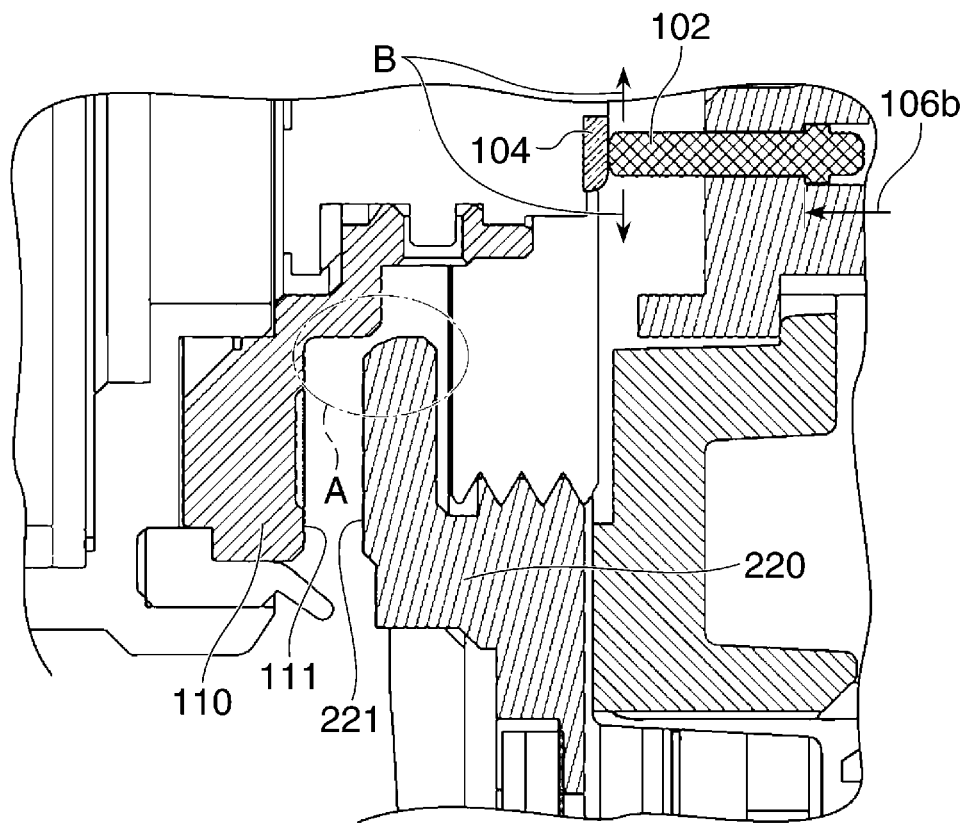
FIG. 17A is a section view, as seen from arrows Z-Z in FIG. 14, showing a state where the lens-side mount portion is fitted into the image pickup apparatus body.
Figure 17B:
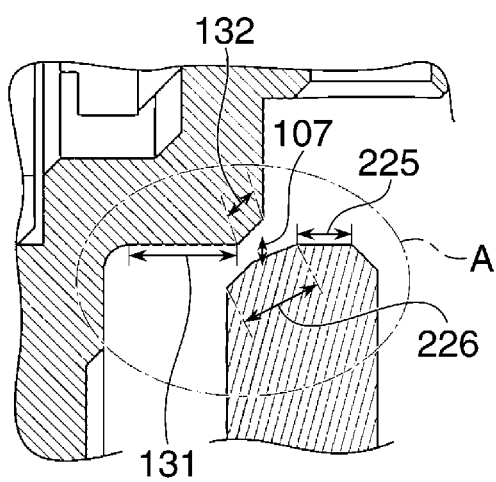
FIG. 17B is an enlarged section view of an A part shown in FIG. 17A.

FIG. 17A is a section view as seen from arrows Z-Z in FIG. 14 and shows a state where the lens-side mount portion 110 of the interchangeable lens 100 is fitted into the image pickup apparatus body 200 and the lens contact terminal pieces 104 start to be in contact with the mount contact terminal pins 102. FIG. 17B is an enlarged section view of an A part in FIG. 17A and shows guide portions by which the lens-side mount portion 110 is fitted into the opening of the stationary mount portion 220 of the image pickup apparatus body 200.

In the state shown in FIG. 17A where the lens contact terminal pieces 104 start to be in contact with the mount contact terminal pins 102, the interchangeable lens 100 is not fixed to the image pickup apparatus body 200. The mount contact terminal pins 102 are urged by the elastic member (not shown) and project toward the interchangeable lens 100 by an amount of movement stroke 106b. The mount face 111 of the lens-side mount portion 110 and the body-side mount face 221 of the stationary mount portion 220 are separated from each other. As shown in FIG. 17B, a fitting portion 131 of the lens-side mount portion 110 and the fitting portion 225 of the stationary mount portion 220 are separated from each other. It should be noted that the fitting portions 131, 225 are sized such that diametral positions of the mount portions 110, 220 (i.e., positions thereof in a direction perpendicular to the optical axis) are determined when these fitting portions are fitted to each other.

The lens-side mount portion 110 is provided with a lens-side guide portion 132 continuous to the mount fitting portion 131. The stationary mount portion 220 is provided with a body-side guide portion 226 continuous to the fitting portion 225. When the lens-side mount portion 110 is fitted into the opening of the stationary mount portion 220, the lens-side and body-side guide portions 132, 226 are brought in contact with each other, whereby the lens-side mount portion 110 can easily be fitted into the opening of the stationary mount portion 220. It should be noted although the lens-side and body-side guide portions 132, 226 are provided in this embodiment, this is not limitative. Guide portions can be provided while taking into account of construction of component parts and usability.

At a position where the body-side and lens-side contact terminal portions (i.e., the mount contact terminal pins 102 and the lens contact terminal pieces 104) are in contact with each other, a gap 107 is formed between the lens-side and body-side guide portions 132, 226 as shown in FIG. 17B. Along the lens-side and body-side guide portions 132, 226, the fitting portion 131 of the lens-side mount portion 110 is guided to the fitting portion 225 of the stationary mount portion 220 in the optical axis direction, while minutely moving in a range of the gap 107 in the direction perpendicular to the optical axis. At this time, the lens-side mount portion 110 is fitted into the opening of the stationary mount portion 220 while the body-side and lens-side contact terminal portions 102, 104 rub against each other in a direction shown by arrow B and substantially perpendicular to the optical axis.

As described above, in this embodiment, when the interchangeable lens 100 is mounted to the image pickup apparatus body 200, the contact terminal portions rub against each other in the direction substantially perpendicular to the optical axis, while the mount fitting portion 131 of the mount portion 110 minutely moves in the range of the gap 107. As a result, an operation to remove impurities, etc. adhered to the contact terminal portions (i.e., a so-called self-cleaning operation) is performed, thereby enhancing the reliability in electrical contact between the contact terminal portions.

Figure 18:
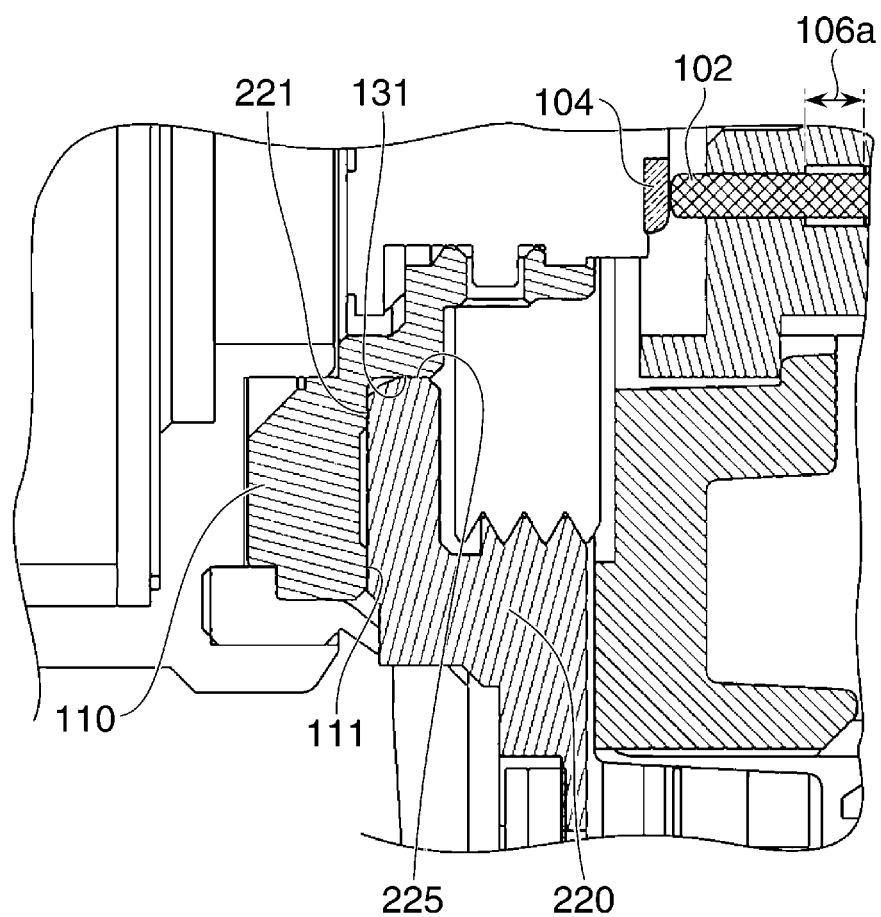
FIG. 18 is a section view, as seen from arrows Z-Z in FIG. 14, showing a state where the interchangeable lens has been mounted to the image pickup apparatus body.

FIG. 18 is a section view as seen from arrows Z-Z in FIG. 14 and shows a state where the interchangeable lens 100 has been mounted to the image pickup apparatus body 200. In this state, the mount face 111 of the lens-side mount portion 110 and the mount face 221 of the stationary mount portion 220 are in close contact with each other in the optical axis direction, the fitting portion 131 of the lens-side mount portion 110 and the fitting portion 225 of the stationary mount portion 220 are fitted with each other, and the lens contact terminal pieces 104 of the interchangeable lens 100 and the mount contact terminal pins 102 of the image pickup apparatus body 200 are in contact with one another.

In this embodiment, when the interchangeable lens 100 is mounted to the image pickup apparatus body 200, the mount contact terminal pins 102 are pressed by the lens contact terminal pieces 104 toward inside the image pickup apparatus body 200 by an amount of movement stroke 106a, while contracting the elastic member (not shown), against an elastic force of the elastic member that urges the mount contact terminal pins 102 toward the interchangeable lens 100. The elastic member applies a contact load to the contact terminal portions (i.e., the lens contact terminal piece 104 and the mount contact terminal pin 102), whereby a required contact pressure can be obtained.

By the self-cleaning operation performed when the interchangeable lens 100 is mounted to the image pickup apparatus body 200, the contact terminal portions rub against each other, and therefore the reliability of contact between the contact terminal portions can be ensured.

As described above, according to this embodiment, the operability in mounting and dismounting the interchangeable lens 100 to and from the image pickup apparatus body 200 can be improved, the secure fixing can be performed, and the reliability in electrical contact between the contact terminal portions can be enhanced by the self-cleaning operation at the contact terminal portions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2012-089306 and 2012-089308, both filed Apr. 10, 2012, which are hereby incorporated by reference herein in their entirety.

What is claimed is:

1. A lens mount provided in an image pickup apparatus body and configured to detachably mount an interchangeable lens having bayonet pawls to the image pickup apparatus body, comprising:
   a fixed portion configured to be fixed to the image pickup apparatus body;
   a stationary mount portion configured to be fixed to said fixed portion, said stationary mount portion having a body-side mount face configured for abutment with a lens-side mount face of the interchangeable lens and having a first screw portion;
   a movable mount portion having pawls configured for engagement with the bayonet pawls of the interchangeable lens and having a second screw portion configured for threaded engagement with the first screw portion; and
   arm portions provided in an area between said fixed portion and said stationary mount portion to project from said movable mount portion,
   wherein said movable mount portion rotates with movement of said arm portions,
   said movable mount portion moves toward said fixed portion with progress of engagement between the first and second screw portions caused by the rotation of said movable mount portion, and
   the pawls of said movable mount portion are brought in abutment with the bayonet pawls of the interchangeable lens with the movement of said movable mount portion.

2. The lens mount according to claim 1, further including:
   a ring portion disposed for rotation relative to said stationary mount portion; and
   an operating portion fastened to at least one of said arm portions through said ring portion and used for rotary operation of said movable mount portion.

3. The lens mount according to claim 2, further including:
   a second fixed portion configured to be fixed to said stationary mount portion and having finger rest portions that are used when said operating portion is rotated.

4. The lens mount according to claim 1, wherein said stationary mount portion and said arm portions are each provided with an abutment face, and the abutment face of said stationary mount portion and the abutment face of at least one of said arm portions are brought in contact with each other to restrict an amount of rotation of said movable mount portion.

5. The lens mount according to claim 1, wherein said stationary mount portion has a side face formed with a notch,
   said movable mount portion has an elastic member configured to urge a spherical metal ball toward the side face of said stationary mount portion,
   the spherical metal ball is fitted into the notch in a state where the bayonet pawls of the interchangeable lens and the pawls of said movable mount portion do not overlap with one another as viewed in an optical axis direction, and
   the spherical metal ball rides on the side face of said stationary mount portion in a state that the bayonet pawls and the pawls overlap with one another as viewed in the optical axis direction.

6. The lens mount according to claim 1, further comprising:
   a body-side contact terminal portion configured to be urged toward a lens-side contact terminal portion of the interchangeable lens for contact with the lens-side contact terminal portion in a state where the interchangeable lens is mounted to the image pickup apparatus body,
   wherein said stationary mount portion is formed with an opening into which the lens-side mount portion of the interchangeable lens is fitted, and
   the lens-side contact terminal portion and the body-side contact terminal portion rub against each other in a direction substantially perpendicular to the optical axis when the lens-side mount portion is being fitted into the opening of said stationary mount portion.

7. The lens mount according to claim 6, wherein said stationary mount portion has a guide portion configured to guide the lens-side mount portion when the lens-side mount portion is fitted into the opening of said stationary mount portion.

8. The lens mount according to claim 1, wherein said arm portions are rotated to rotate said movable mount portion about an optical axis.

9. The lens mount according to claim 1, wherein with rotation of said movable mount portion, a shift is made from a state where the bayonet pawls of the interchangeable lens and the pawls of said movable mount portion do not overlap with one another as viewed in an optical axis direction to a state where they overlap with one another as viewed in the optical axis direction.

10. An image pickup apparatus comprising:
   an image pickup apparatus body having a lens mount configured to detachably mount an interchangeable lens having bayonet pawls to the image pickup apparatus body, comprising:
   a fixed portion configured to be fixed to the image pickup apparatus body;
   a stationary mount portion configured to be fixed to said fixed portion, said stationary mount portion having a body-side mount face configured for abutment with a lens-side mount face of the interchangeable lens and having a first screw portion;
   a movable mount portion having pawls configured for engagement with the bayonet pawls of the interchangeable lens and having a second screw portion configured for threaded engagement with the first screw portion; and
   arm portions provided in an area between said fixed portion and said stationary mount portion to project toward from said movable mount portion,
   wherein said movable mount portion rotates with movement of said arm portions,
   said movable mount portion moves toward said fixed portion with progress of engagement between the first and second screw portions caused by the rotation of said movable mount portion, and
   the pawls of said movable mount portion are brought in abutment with the bayonet pawls of the interchangeable lens with the movement of said movable mount portion.

* * * * *